United States Patent
Bortolini et al.

(10) Patent No.: US 11,288,968 B2
(45) Date of Patent: Mar. 29, 2022

(54) METHOD AND APPARATUS TO SWITCH BETWEEN MULTIPLE FORMATS OF RUNWAY SURFACE CONDITIONS TO COMPUTE REQUIRED RUNWAY DISTANCES

(71) Applicant: HONEYWELL INTERNATIONAL INC., Morris Plains, NJ (US)

(72) Inventors: Ricardo Darif Bortolini, Sao Jose Dos Campos (BR); Pivin Joe Amalanathan, Bangalore (IN); Mallikarjun Sajjan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 272 days.

(21) Appl. No.: 16/577,525

(22) Filed: Sep. 20, 2019

(65) Prior Publication Data
US 2021/0090444 A1 Mar. 25, 2021

(51) Int. Cl.
G08G 5/00 (2006.01)
G08G 5/02 (2006.01)
B64D 45/04 (2006.01)
G06F 7/06 (2006.01)

(52) U.S. Cl.
CPC ........... *G08G 5/0021* (2013.01); *B64D 45/04* (2013.01); *G08G 5/0065* (2013.01); *G08G 5/02* (2013.01); *G06F 7/06* (2013.01); *G08G 5/0034* (2013.01)

(58) Field of Classification Search
CPC ...... G08G 5/0021; G08G 5/02; G08G 5/0065; G08G 5/0034; B64D 45/04; G06F 7/06
See application file for complete search history.

(56) References Cited

U.S. PATENT DOCUMENTS

| 8,116,989 | B2 | 2/2012 | Journade et al. |
| 8,773,289 | B2 | 7/2014 | Maggiore et al. |
| 9,014,881 | B2 | 4/2015 | DeGagne et al. |
| 9,663,223 | B1 | 5/2017 | Harrison et al. |
| 2009/0125169 | A1* | 5/2009 | Edwards ............ G08G 5/0013 701/16 |

(Continued)

OTHER PUBLICATIONS

Visvanathan Thanigai Nathan, et al. "System for Assessing Runway Condition for Predicting Quantitative Real Time Landing Run Efficiency and Relaying through Connectivity," ip.com, Mar. 5, 2018.

*Primary Examiner* — Dale W Hilgendorf
(74) *Attorney, Agent, or Firm* — Lorenz & Kopf, LLP

(57) ABSTRACT

A method and apparatus for assessing runway surface conditions including: configuring a runway surface processing module to process: a first type of reported runway surface condition information, a second type of a set of Runway Condition Assessment Matrix (RCAM) codes, and a third type of a set of runway surface condition codes including: SNOWTAM codes; selecting, at least one of the first, second or third types of runway surface information to input to the runway surface processing module, to estimate at least a braking distance and a braking action of the aircraft; receiving, by input, one of at least the first, second or third types of runway surface information by the runway surface processing module; and mapping a runway surface condition, reported or entered of the first, second or third types of runway surface information, to a particular runway condition code to compute the required runway distance.

18 Claims, 8 Drawing Sheets

(56) References Cited

U.S. PATENT DOCUMENTS

| | | | | |
|---|---|---|---|---|
| 2010/0274468 A1* | 10/2010 | Durham | ............... | G08G 5/0021 |
| | | | | 701/120 |
| 2013/0127642 A1* | 5/2013 | Maggiore | ............ | G08G 5/0021 |
| | | | | 340/947 |
| 2013/0261855 A1* | 10/2013 | DeGagne | ............. | G08G 5/0026 |
| | | | | 701/16 |
| 2016/0140854 A1 | 5/2016 | Enns et al. | | |
| 2016/0272344 A1* | 9/2016 | Degagne | ............. | G08G 5/0021 |
| 2016/0362093 A1* | 12/2016 | Gadzinski | ............ | G08G 5/0021 |
| 2019/0054906 A1* | 2/2019 | Pedapudi | ............ | G08G 5/0013 |
| 2019/0251852 A1* | 8/2019 | Moll | .................... | G08G 5/0021 |
| 2020/0013297 A1* | 1/2020 | Kanagarajan | ........ | G08G 5/0086 |
| 2020/0160736 A1* | 5/2020 | Moll | .................... | G08G 5/0091 |

* cited by examiner

| RUNWAY CONDITION DESCRIPTION | RwyCC | Mu (μ) | VEHICLE DECELERATION OR DIRECTIONAL CONTROL OBSERVATION | PILOT REPORTED BRAKING ACTION |
|---|---|---|---|---|
| • DRY | 6 | 40 OR HIGHER | --- | --- |
| • FROST<br>• WET (INCLUDES DAMP AND 1/8 INCH DEPTH OR LESS OF WATER)<br>1/8 INCH (3mm) DEPTH OR LESS OF:<br>• SLUSH<br>• DRY SNOW<br>• WET SNOW | 5 | | BRAKING DECELERATION IS NORMAL FOR THE WHEEL BRAKING EFFORT APPLIED AND DIRECTIONAL CONTROL IS NORMAL | GOOD |
| 5°F (-15°C) AND COLDER OUTSIDE TEMPERATURE:<br>• COMPACTED SNOW | 4 | 39 TO 30 | BRAKING DECELERATION OR DIRECTIONAL CONTROL IS BETWEEN GOOD AND MEDIUM | GOOD TO MEDIUM |
| • SLIPPERY WHEN WET (WET RUNWAY)<br>• DRY SNOW<br>GREATER THAN 1/8 INCH (3mm) DEPTH OF:<br>• WET SNOW<br>WARMER THAN 5°F (-15°C) OUTSIDE AIR TEMPERATURE:<br>• COMPACTED SNOW | 3 | | BRAKING DECELERATION IS NOTICEABLY REDUCED FOR THE WHEEL BRAKING EFFORT APPLIED OR DIRECTIONAL CONTROL IS NOTICEABLY REDUCED | MEDIUM |
| GREATER THAN 1/8 INCH (3mm) DEPTH OF:<br>• WATER<br>• SLUSH | 2 | 29 TO 21 | BRAKING DECELERATION OR DIRECTIONAL CONTROL IS BETWEEN MEDIUM AND POOR | MEDIUM TO POOR |
| • ICE[2] | 1 | | BRAKING DECELERATION IS SIGNIFICANTLY REDUCED FOR THE WHEEL BRAKING EFFORT APPLIED OR DIRECTIONAL CONTROL IS SIGNIFICANTLY REDUCED | POOR |
| • WET ICE[2]<br>• SLUSH OVER ICE<br>• WATER OVER COMPACTED SNOW[2]<br>• DRY SNOW OR WET SNOW OVER ICE[2] | 0 | 20 OR LOWER | BRAKING DECELERATION IS MINIMAL TO NON-EXISTENT FOR THE WHEEL BRAKING EFFORT APPLIED OR DIRECTIONAL CONTROL IS UNCERTAIN | NIL |

FIG. 3

METHOD AND APPARATUS TO SWITCH BETWEEN MULTIPLE FORMATS OF RUNWAY SURFACE CONDITIONS TO COMPUTE REQUIRED RUNWAY DISTANCES

TECHNICAL FIELD

Embodiments of the subject matter described herein relate generally to assessing runway surface condition during an approach of an aircraft, and more particularly, embodiments of the subject matter relate to a method and apparatus to switch between inputs of different reporting formats for reported runway surface information.

BACKGROUND

The landing and takeoff phases for aircraft are likely considered the most critical and highest workload of flight phases. When executing, for example, the final approach, pilots must manage various types of information to make correct landing decisions and ultimately safely land the aircraft. For example, one type of information, typically provided electronically via voice communications is related to the airport's runway condition for the pilot to decide whether to land on the airport or not.

Currently, it is the responsibility of the airport operators to assess the runway surface condition and report the runway condition to pilots in the following ways of: (1) a runway surface condition and contaminant depth (Non RwyCC) where the airport operators will evaluate the runway condition and report a runway Surface condition such as dry, wet, snow etc. along with the contaminant depth in cases of contaminated runways via the ATIS broadcast or with the NOTAM Runway surface condition; (2) a runway condition assessment matrix (RCAM) where the airport operators are required to assess the runway condition and report through the utilization of the runway condition assessment matrix codes (RwyCC); and (3) a SNOWTAM (Non-RwyCC) which is a special series NOTAM notifying the presence, or removal, of hazardous conditions due to snow, ice, slush or standing water associated with snow, slush and ice on the movement area, by using a specific format to reference each hazardous type of condition.

Currently, there is no runway distance processing system available that enables a pilot to switch between each of the reporting formats received (i.e. between the RwyCC and Non-RwyCC reporting formats) of the surface runway condition in order to compute the required runway distance.

Hence, it is desirable that pilots have the ability to switch between the different reporting formats of runway surface conditions in order to use runway surface information of each of the different reported formats to compute the required runway distances for approach or takeoff.

Accordingly, an improved apparatus and method for retrieving information about reported runway surface conditions that switch between different reporting surface condition formats are desired. The following disclosure provides these technological enhancements, in addition to addressing related issues.

Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method and apparatus for switching between multiple reporting formats for receiving runway surface information.

In one embodiment, a computer-implemented method for assessing runway conditions to compute required runway distances of an aircraft while facilitating a landing or takeoff of the aircraft at an airport wherein the runway is subject to different runway surface conditions is provided. The method includes: configuring a runway surface processing module to process at least a first, second and third type of runway surface information of a plurality of types of runway surface information transmitted by air traffic control (ATC) wherein a broadcast of data transmissions of the ATC include: a first type of reported runway surface condition information, a second type of a set of Runway Condition Assessment Matrix (RCAM) codes, and a third type of a set of runway surface condition codes including: Snow Warning To Airmen (SNOWTAM) codes; selecting, at least one of the first, second or third types of runway surface information to input to the runway surface processing module, to estimate at least a braking distance and a braking action of the aircraft; receiving, by input, one of at least the first, second or third types runway surface information by the runway surface processing module; and mapping a runway surface condition, reported or entered of the first, second or third types of runway surface information, to a particular runway condition code to compute the required runway distance.

In various exemplary embodiments, the method, further includes: entering the input by either manual operations of the pilot using a graphic user interface coupled to the runway surface processing module in response to runway surface information communicated by voice transmissions to the pilot, or by input from automated responses from a ground server to data requests from the runway surface processing module when landing or takeoff wherein the ground server is electronically connected to the runway surface processing module.

The method, the mapping further including: processing by the runway surface module, the input and the entry from the pilot using a set of rules mapping inputs, and entries of runway surface conditions to RCAM codes including: an internal mapped runway condition code (RCC)=1 if the input of the runway surface condition code (RwyCC)=1 or the pilot entry of the braking action is poor and the pilot entry of the runway surface condition is ice; the internal mapped RCC=2 if the RwyCC=2, or the pilot entry of the braking action is medium to poor, or the runway surface condition is standing water and a runway contaminant depth is >0.125 inches, or the pilot entry of the runway surface condition is slush and the runway contaminant depth is >0.125 inches; the internal mapped RCC=3 if the RwyCC=3, or the pilot entry of the braking action is medium, or the runway surface condition is compact snow and an operating air temperature (OAT) is >45 degrees Celsius, or the pilot entry of the runway surface condition is dry snow and the runway contaminant depth is >0.125 inches, or the pilot entry of the runway surface condition is wet snow and the runway contaminant depth is >0.125 inches, or the runway surface condition is slippery; the internal mapped RCC=4, if the RwyCC=4, or the pilot entry of the braking action is good to medium, or the pilot entry of the runway surface condition is compact snow and the OAT is <−15 degrees Celsius; the internal mapped RCC=5, if the RwyCC=5, or the pilot entry of the braking action is good, or the pilot entry of the runway surface condition is wet; and the internal mapped RCC=6, if the RwyCC=6, or the pilot entry of the braking action is not applicable, or the pilot entry of the runway surface condition is dry. The method, further including: calculating a required runway distance by the runway surface processing module for the landing or takeoff based in part on the first, second or third type of runway surface information received by the input. The method, further including: calculating the required runway distance by the runway surface processing module for the landing or takeoff based on additional runway surface information retrieved from a ground server comprising: wet, dry and contaminated runway distance data from tables stored by the ground server for correcting the runway distance calculations. The method, further including: calculating the required runway distance by the runway surface processing module for the landing or takeoff using aircraft performance data from a performance database of the aircraft comprising: a calculated landing or takeoff weight of the aircraft. The method, further including: correcting the calculated required runway distances based on current environmental conditions at a time of the landing or takeoff comprising: a headwind and an outside air temperature. The method, further including: mapping, by the runway surface processing module, the runway surface condition related to the first, second, and third type for runway surface information to one of a set of RCAM codes based on one or more of a plurality of actions on the part of the pilot governed by a set of logical rules applied to the actions comprising: a pilot entry of a selection of an RCAM code, a pilot entry of a selection of a braking action, and a pilot entry of a selection of a runway surface condition wherein the pilot entry is performed using a graphic user interface coupled to the runway surface processing module for sending each selection to the runway surface processing module. The RCAM codes range in value from 1 to 6 corresponding to each runway surface condition comprising a set of environmental conditions of ice, snow, slush, water, wetness, and dry runway surfaces.

In another embodiment, an apparatus for detecting performance of a current landing or takeoff of an aircraft by predicting the landing or takeoff distance of an aircraft prior to the landing or takeoff for the current flight is provided. The apparatus includes: at least one processor programmed to receive at least a first, second and third type of runway surface information transmitted by air traffic control (ATC) which include: a first type of reported runway surface condition information, a second type of a set of Runway Condition Assessment Matrix (RCAM) codes, and a third type of a set of runway surface codes which include: Snow Warning To Airmen (SNOWTAM) codes; one or more inputs sent to the at least one processor of a selection of at least one of the first, second or third type of runway surface information for processing to estimate at least a braking distance or a braking action of the aircraft; and a matrix of mapped runway surface codes generated by the at least one processor by a mapping using a set of rules for applying each runway surface condition derived from the first, second or third type of runway surface information to a runway condition code to compute a required runway distance.

The apparatus, further includes: the one or more inputs entered by either a manual operation of the pilot via a graphic user interface coupled to the at least one processor in response to runway surface information communicated by voice transmissions to the pilot, or entered by automated responses from a ground server in response to a data request from the at least one processor at landing or takeoff wherein the ground server is electronically connected to the at least one processor. The apparatus further includes a model generated, by the at least one processor, based on a baseline model of the aircraft to calculate the required runway distance for the landing or takeoff taking into account the first, second or third type of runway surface information. The apparatus further includes the at least one processor correcting the model for the required runway distance calculations for the landing or takeoff based on runway surface information retrieved from the ground server from wet, dry and contaminated runway distance tables stored in the database of historic wet, dry and contaminated runway distance calculations.

The apparatus further includes the at least one processor correcting the model for the required runway distance calculations for the landing or takeoff based on runway surface information retrieved from a performance database of aircraft performance data at least including a landing or takeoff weight of the aircraft. The apparatus further includes at least one processor correcting the model for the required runway distance calculations for the landing or takeoff based on environmental conditions at least including a runway headwind and an outside air temperature. The apparatus, further includes: the at least one processor maps the runway surface condition to the first, second, and third type for runway surface information to generate the matrix by the set of rules to identify at least one of a set of RCAM codes from on one or more of a plurality of actions on the part of the pilot governed by the set of rules including: a pilot entry of selection of an RCAM code, a pilot entry of selection of a braking action, and a pilot entry of selection of a runway surface condition wherein the pilot entry is performed using a graphic user interface coupled to the at least one processor to send the inputted selection to the at least one processor.

In yet another embodiment, a non-transitory, computer-readable medium containing instructions thereon, which, when executed by a processor, perform a method for selecting runway surface information is provided. The method includes: implementing, by the processor, a model to determine a required runway distance by processing at least one of a first, second and third type of runway surface information of a plurality of types of runway surface information transmitted by air traffic control (ATC) including: a first type of reported runway surface condition information, a second type of a set of Runway Condition Assessment Matrix (RCAM) codes, and a third type of a set of runway condition surface codes including: Snow Warning To Airmen (SNOWTAM) codes; selecting at least one of the first, second or third type of runway surface information to input to the processor and to estimate at least a braking action of the aircraft; receiving by input one of at least the first, second or third type runway surface information by the processor; and mapping, by the processor, a runway surface condition reported or entered of the first, second or third type of runway surface information to a runway condition code to compute the runway distance.

In various exemplary embodiments, the method, further includes: entering the input by either manual operations of the pilot using a graphic user interface coupled to the processor in response to runway surface information communicated by voice transmissions to the pilot, or by input from automated responses from ground servers to data request from the runway surface processing module wherein the ground servers are electronically coupled to the processor. The method further includes: calculating a required runway distance by the processor for a landing and a takeoff based on the first, second or third type of runway surface information received by an input. The method further includes: calculating the required runway distance by the processor for the landing and takeoff using runway surface information retrieved from a ground server including wet, dry and contaminated runway distance data for correcting the required runway distance calculations.

This summary is provided to introduce a selection of concepts in a simplified form that is further described below in the detailed description.

This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 is an exemplary operational assessment matrix (RCAM) table issued by the FAA that is used to assess the runway surface condition and the braking action reported by the pilot related to the reporting data for the runway surface condition system in accordance with an embodiment;

DETAILED DESCRIPTION

Figure 1:
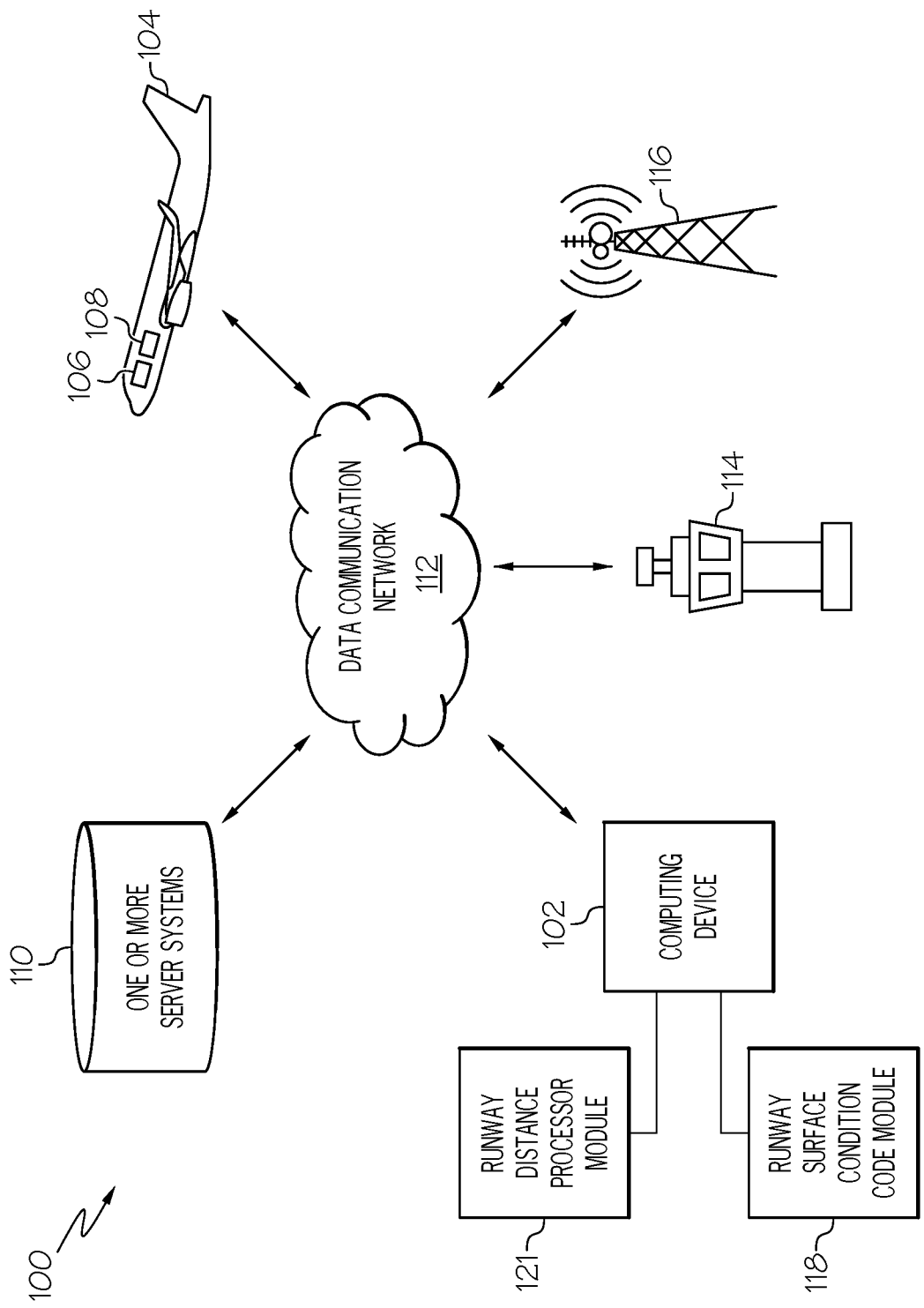
FIG. 1 illustrates a diagram of a system for providing runway surface condition reporting to an aircraft, in accordance with an exemplary embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Runway safety-related accidents (i.e. runway excursions) remain a significant safety risk for airlines. The contributing factors include poor braking action due to contaminated runways or taxiways, combined with shortfalls in the accuracy and timeliness of reporting runway surface conditions. In 2017, The International Civil Aviation Organization (ICAO) put forth a global runway safety action plan that called for the widespread deployment of the ICAO format for assessing and reporting runway surface conditions as effective mitigation to runway incursions. The Global Reporting Format (GRF) for reporting runway surface conditions, originated in data from the Federal Aviation Authority (FAA) data of Take-off and Landing Performance Assessment (TALPA) and is deemed applicable for widespread use by 2020. The GRF provides a standardized reporting format of runway surface conditions on wet and contaminated runways which can then directly be correlated with an aircraft's performance for predicting take-off and landing runway performances (i.e. distances) of aircraft.

Hence, by Oct. 1, 2016, the FAA obligated airports, airline flight crews, dispatchers, general aviation pilots, and air traffic controllers to begin using the Takeoff and Landing Performance Assessment (TALPA) formats. These standard formats were developed and have reduced the risk of runway overrun accidents and incidents caused by runway contamination related to weather and other factors. The change standardizes how airports evaluate and report runway conditions with the use of a Runway Condition Assessment Matrix (RCAM). These changes replace subjective judgments by airport operators of runway conditions with objective assessments tied directly to contaminant type and depth categories. Hence, all airport operators are now required to be knowledgeable on TALPA reporting procedures and to comply with the requirements including requiring airports to generate runway condition codes (RwyCC) and properly report them to pilots.

To comply with this reporting regulation, airport operators also must utilize the Notice to Airmen (NOTAM) system as the primary process for timely collection and dissemination of airport information to air carriers and other airport users. The first and preferred method is using a NOTAM manager application that enables a direct-entry system that automatically generates a RwyCC from data entered by the airport operator.

Other tangent benefits were also derived with the standardized reporting formats for runway surface conditions; for example, airlines routinely perform reduced thrust takeoff to improve engine reliability, maintenance, and operating costs. The utilization of less than maximum thrust reduces the engine deterioration, hence engine manufacturers encourage operators to perform reduced thrust takeoffs whenever possible. By taking into account runway surface conditions with the standardized reporting data thrust calculations for takeoff can be better managed.

This is because the takeoff runway distances and thrust settings are calculated prior to takeoff utilizing outside air temperature, pressure, weight, assumed runway distance (i.e. a baseline distance for takeoff) and wind conditions via flight management systems. In the case of an unexpected condition (i.e. a weather-related runway surface condition), it can directly affect the calculations for required runway distances causing deviations from the standard or original distance computations. For example, the acceleration levels in the case of the takeoff changes and the takeoff distances become different compared to the initial estimate. Consequently, there exists a need to correct the takeoff runway distance calculations that takes into account the impact of the runway surface condition and offer guidance for takeoff thrust adjustments.

In various embodiments, the present disclosure describes a real-time, highly accurate runway surface condition system and method for assessing runway conditions during landing and takeoff to improve safety. Also, in the case of takeoff, the system enables corrections in the retarded acceleration that can introduce cost savings and engine reliability in cases of greater than required acceleration.

In various exemplary embodiments, the present disclosure describes systems and methods to switch between RCAM (RwyCC), Runway Surface Condition or SNOWTAM ways of runway surface condition reporting and to compute the required Runway Distance. Currently, the Runway Distance Processor Module accepts the traditional way of reporting Runway Surface Condition along with contaminant depths. The present disclosure describes implementing a runway distance processor module which accepts multiple (i.e. different ways) reported inputs of runway surface condition reporting data from RwyCC (RCAM) and Non-RwyCC (ex. runway surface condition and contaminant depth, and SNOWTAM) and calculates the required runway distance taking into account the reported data.

In various exemplary embodiments, the present disclosure provides manual, semi-automated and automated methods and systems for entry of runway surface condition formats to support multiple inputs of runway surface condition reporting of the RwyCC (RCAM) or the Non-RwyCC (Runway surface condition and contaminant depth code), or the SNOWTAM.

In various exemplary embodiments, the present disclosure provides methods and systems for internal mapping of a set of equivalent runway condition codes based on both RwyCC (RCAM) or Non-RwyCC (Runway surface condition and contaminant depth), or for SNOWTAM reported conditions. The internal mapping of non-RwyCC and RwyCC to Runway Condition code enables non-RwyCC systems to operate in a similar manner as a RwyCC system.

In various exemplary embodiments, the present disclosure describes methods and systems for implementing a mapped runway condition code with a runway distance processor module to compute a required runway distance.

In various exemplary embodiments, the present disclosure describes methods and systems for implementing a runway distance processor algorithm that considers input data of a reported RwyCC or non-RwyCC surface condition. When the RwyCC is 2 or 3, then the equivalent water/contaminant depth is considered as a constant high-value depth equivalent to the friction of 25 Mu. The constant value can be tuned through the use of data from a database or any configurable item to provide better results.

Turning now to the figures, FIG. 1 illustrates a diagram of a system 100 for providing runway surface condition reporting to an aircraft, in accordance with an exemplary embodiment. The system 100 operates to compute and present dynamic, real-time, required runway distance calculations onboard an aircraft 104 during flight (i.e. at an approach, landing or takeoff). In circumstances where a reported runway surface condition affects the distance calculations, the system 100 operates to compute and present dynamic, real-time, options, for a different process to switch between to calculate the required runway distance onboard the aircraft 104 during flight. The system 100 may include, without limitation, a computing device 102 that communicates with one or more avionics systems 106, including at least a Flight Management System (FMS) 108, onboard the aircraft 104 and one or more server systems 110, via a data communication network 112. In practice, certain embodiments of the system 100 may include additional or alternative elements and components, as desired for the particular application.

The computing device 102 may be implemented by any computing device that includes at least one processor, some form of memory hardware, a user interface, and communication hardware. For example, the computing device 102 may be implemented using a personal computing device, such as a tablet computer, a laptop computer, a personal digital assistant (PDA), a smartphone, or the like. In this scenario, the computing device 102 is capable of hosting, maintaining, and executing and a runway surface condition code module 118 for mapping runway surface codes for processing by a runway distance processor module 121. The runway distance processor module 121 is configured to determine and present projected and corrected runway distances. In other embodiments, the computing device 102 may be implemented using a computer system onboard, and integrated into, the aircraft 104, wherein the computing device 102 is configured to determine and present flight modeling data such as baseline calculations of required runway distances etc. and flight operational changes (i.e. braking changes) as a result of the modeled behavior of calculated required runway distances.

The aircraft 104 may be any aviation vehicle for which flight cost modeling and flight cost recovery options are relevant and applicable during completion of a flight route. The aircraft 104 may be implemented as an airplane, helicopter, spacecraft, hovercraft, an unmanned aerial vehicle (UAV), or the like. The one or more avionics systems 106 include the FMS 108, and may also include Automatic Dependent Surveillance-Broadcast (ADS-B) devices, navigation devices, weather radar, brake systems, or the like. Data obtained from the one or more avionics systems 106 and the FMS 108 may include, without limitation: flight data, weather data, brake system data, weight, and balance data, runway analysis data, aircraft performance data, or the like.

The air traffic control (ATC) 114 may be an air traffic control station or any other ground-based location from which personnel communicates with the aircraft 104, including the ground-based personnel and equipment concerned with monitoring and controlling air traffic within a particular area. The ATC 114 functions to communicate with the aircraft 104 to facilitate cost events, including receiving clearance requests from the aircraft 104 for user-selected flight plan change options, and communicating approval or denial to the aircraft 104 for a received clearance request. The ATC 114 is also representative of a flight operation control ground station, and may provide other communications to the aircraft 104, including but not limited to: historic flight route performance data, cost parameter data, terminal area broadcast data, air traffic control broadcast data, current and historical weather data, current and historic NOTAM data, SNOWTAM data, runway surface condition data and the like.

In certain embodiments, the aircraft 104 and/or the computing device 102 receives all of the data from the ATC 114 (or other ground control station) and uses the data to compute and predict required runway distance calculations by the runway distance processor module 121 that may allow cost savings in aircraft maintenance and operation. In this scenario, the ATC 114 or other ground control station generate runway surface condition data or receive this data from other sources (e.g., one or more server systems 110, airline data management, historic flight route data sources, weather data sources, NOTAM data sources, terminal area broadcast sources, or the like). However, in other embodiments, the aircraft 104 and/or the computing device 102 communicates directly with external sources to obtain the runway surface condition data during a flight, including: (i) the one or more server systems 110 (e.g., current and historic runway surface data at an airport, third-party services providing weather data and NOTAM data, airline data management, historical data, routes and seasonal variations), (ii) the Traffic Information Service-Broadcast (TIS-B) 116, (iii) the ATC 114, and any other source of data applicable to compute required runway distances taking into account current surface conditions of the runway.

The one or more server systems 110 may include any number of application servers, and each server may be implemented using any suitable computer. In some embodiments, one or more server systems 110 includes one or more dedicated computers. In some embodiments, the one or more server systems 110 includes one or more computers carrying out other functionality in addition to server operations. The one or more server systems 110 may store and provide any type of data used to compute flight plan alternatives for parking costs, fuel costs, and savings when the actual cost of a flight exceeds a cost target for the flight. Such data may include, without limitation: flight plan data, air traffic control broadcast data, terminal area broadcast data, third-party services data (e.g., weather data, Notices to Airmen (NOTAM)) data, historic flight route data, historic aircraft performance data, airline data management data, flight cost parameter data, cost deviation parameter data, aircraft performance and operational capability data, and other data compatible with the computing device 102.

The computing device 102 is located onboard the aircraft 104, and the computing device 102 communicates with the one or more avionics systems 106 via wired and/or wireless communication connection. The computing device 102 and each of the one or more server systems 110, the air traffic control 114, and the Traffic information service-broadcast (TIS-B) 116, are generally disparately located, and the computing device 102 communicates with each of the one or more server systems 110, the air traffic control 114, and the TIS-B 116, via the data communication network 112 and/or via other communication mechanisms onboard the aircraft 104. The data communication network 112 may be any digital or other communications network capable of transmitting messages or data between devices, systems, or components. In certain embodiments, the data communication network 112 includes a packet-switched network that facilitates packet-based data communication, addressing, and data routing. The packet-switched network could be, for example, a wide area network, the Internet, or the like. In various embodiments, the data communication network 112 includes any number of public or private data connections, links or network connections supporting any number of communications protocols. The data communication network 112 may include the Internet, for example, or any other network based upon TCP/IP or other conventional protocols. In various embodiments, the data communication network 112 could also incorporate a wireless and/or wired telephone network, such as a cellular communications network for communicating with mobile phones, personal digital assistants, and/or the like. The data communication network 112 may also incorporate any sort of wireless or wired local and/or personal area networks, such as one or more IEEE 802.3, IEEE 802.16, and/or IEEE 802.11 networks, and/or networks that implement a short range (e.g., BLUETOOTH®) protocol. For the sake of brevity, conventional techniques related to data transmission, signaling, network control, and other functional aspects of the systems (and the individual operating components of the systems) may not be described in detail herein.

During typical operation, the computing device 102 obtains relevant runway surface condition information by manual input (or automated transmissions) associated with a particular flight, including anticipated weather conditions for the particular flight and an estimated required runway distance calculation and data of wet, dry, contaminant runway distances for the particular flight and aircraft based on the flight plan and aircraft attributes like weight, from air traffic control 114, TIS-B 116, and the one or more server systems 110. During flight onboard, the aircraft 104, the computing device 102 continuously and dynamically obtains aircraft parameter data, such as the aircraft weight and wind conditions from the plurality of avionics systems 106 and the FMS 108, and creates an estimated distance model for the landing. The computing device 102 uses the real-time modeled distance calculations and corrections to obtain the best-estimated required runway distance calculation. The computing device 102 is further configured to receive a user input selection and upload, link, or otherwise transmit the user-selected runway surface condition data to the FMS 108, thereby initiating action by the FMS 108 to alter the flight plan according to the user selection of runway surface conditions. Additionally, the computing device 102 is configured to continuously and dynamically obtain real-time aircraft parameters and to update the real-time model continuously throughout the flight. Such dynamic, real-time obtained aircraft parameters consider aircraft parameters that are updated in real-time, which may alter previously-calculated flight plan such as baseline calculations of the runway surface distances.

Figure 2:
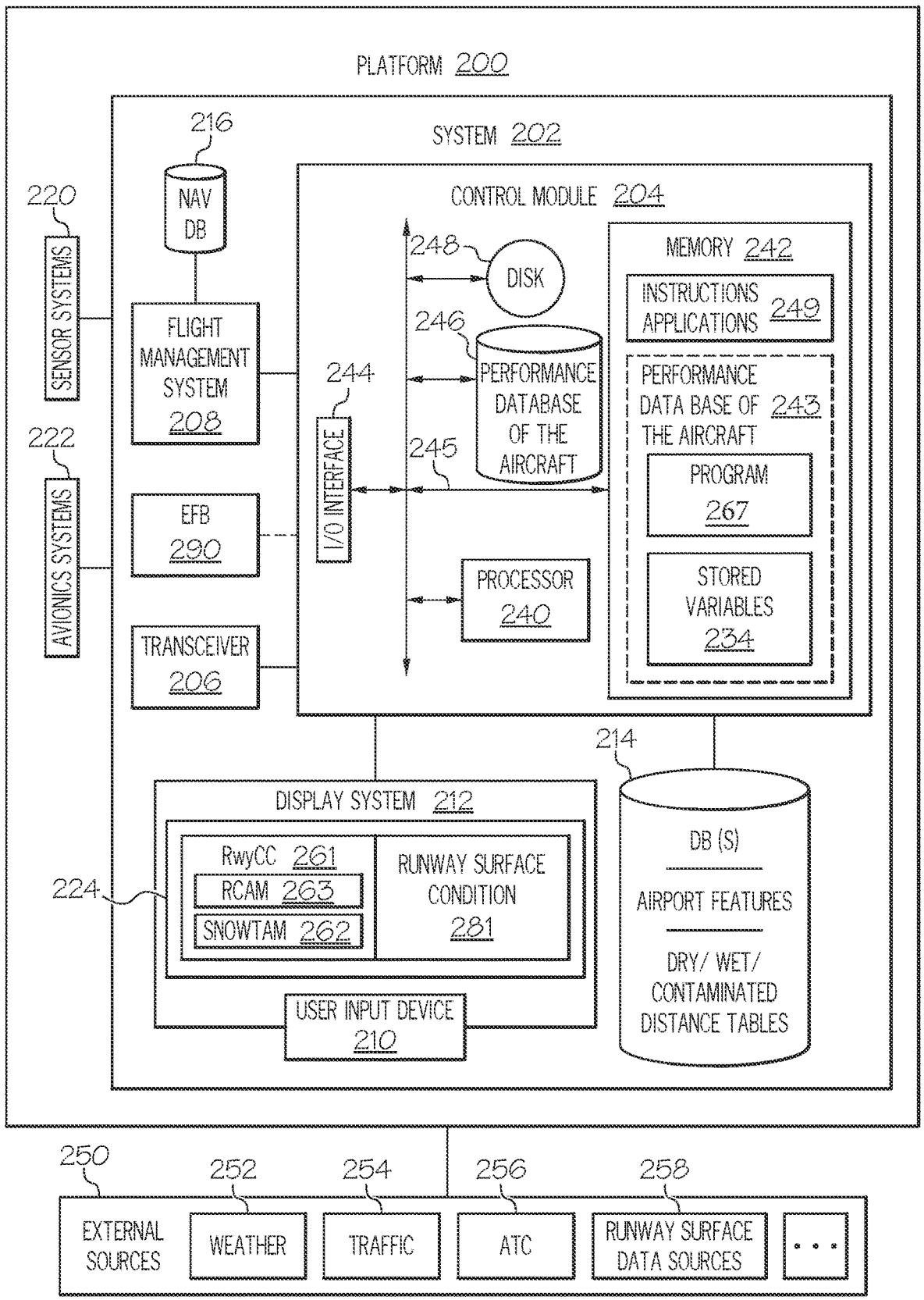
FIG. 2, illustrates a diagram, of a system for evaluation of required runway distances that is hosted on a platform which can be either a mobile or integrated platform with the aircraft avionics systems, in accordance with an embodiment.

Turning now to FIG. 2, which illustrates a diagram, in an embodiment, of the runway surface condition system for evaluation of required runway distances 202 (also referred to herein as "system" 202) and is hosted on a platform 200 which can be either a mobile or integrated platform with the aircraft avionics systems. In various embodiments, platform 200 is an aircraft and is referred to as aircraft 100. The system 202 embodies a required runway distance correction control module 204 (also referred to herein as "control module" 204). In some embodiments, the control module 204 may be integrated within a preexisting mobile platform management system, avionics system, cockpit display system (CDS), flight controls system (FCS), or aircraft flight management system (FMS 208). Although the control module 204 is shown as an independent functional block, onboard the aircraft 200, optionally, it may exist in an optional electronic flight bag (EFB 290). In embodiments in which the control module 204 is within the EFB 290, the display system 212 and user input device 210 may also be part of the EFB 290. Further, in some embodiments, the control module 204 may reside in a portable electronic device (PED) such as a tablet, cellular phone, or the like.

The control module 204 performs the functions of the system 202. In order to perform these functions, the control module 204 may be operatively coupled to any combination of the following aircraft systems: a transceiver 206, a source of aircraft status data, such as a flight management system (FMS) 208, a user input device 210 for selecting a runway surface condition, display system 212 for displaying graphic user interfaces (i.e selection buttons displayed for the runway surface codes (RwyCC) 261, the SNOWTAM 262, and the RCAM 263), and one or more databases 214 (i.e. for storing dry/wet/contaminated distance tables of distance data). The functions of these aircraft systems and their interaction are described in more detail below.

The FMS 208 is configured to provide real-time navigation data and/or information regarding the operation of the aircraft 200, including real-time flight guidance for aircraft 200. As used herein, "real-time" is interchangeable with current and instantaneous. In operation, the FMS 208 may further be integrated with, or receive and process, real-time data and information from a sensor system 220 and a navigation database 216. As used herein, the FMS 208 supports controller pilot data link communications (CPDLC), such as through an aircraft communication addressing and reporting system (ACARS) router; this feature may be referred to as a communications management unit (CMU) or communications management function (CMF).

The sensor system 220 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS 208, as will be appreciated in the art. The navigation database 216 may be a storage location that may maintain a database of flight plans, as well as information regarding terrain and airports and/or other potential landing locations (or destinations) for the aircraft 200. In this regard, the navigation database 216 can maintain an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface condition of the runways or taxi path, and the like).

The avionics system(s) 222 provide aircraft performance data and feedback for subsystems on the aircraft 200. Examples of the performance data include engine thrust level, fuel level, braking applications, braking status, temperature control system status, and the like. As may be appreciated, the avionics system(s) 222 may, therefore, include a variety of onboard detection sensors, and may be operationally coupled to the FMS 208 for enabling corrections as a result of runway surface conditions.

Accordingly, the FMS 208 is a source for real-time aircraft status data of the aircraft 200, the aircraft status data (also referred to herein as navigation data) including any of: (i) the instantaneous position and location, vertical speed, and ground speed of the aircraft 200 (e.g., the latitude, longitude, orientation, and flight path angle), (ii) the instantaneous altitude (or height above ground level) for the aircraft 200, (iii) the instantaneous heading of the aircraft 200 (i.e., the direction the aircraft is traveling in relative to some reference), and (iv) the current phase of flight. Additionally, the FMS 208 is configured to compare the instantaneous position and heading of aircraft 200 with an intended flight plan for aircraft 200. The real-time aircraft status data referred to as host aircraft status data, is made available such that the display system 212, the transceiver 206, and the control module 204, may further process and/or handle the aircraft status data including status corrections such as required runway distance calculations and corrections to braking applications.

The display system 212 includes a display device 224. The display system 212 is configured to continuously receive real-time flight status and flight plan information from the FMS 208 and further display graphic user interfaces for presentation of runway surface condition data for selection by the pilot. The control module 204, the user input device 210 and the display system 212 are cooperatively configured to receive input from the pilot and send selected runway surface information from the received reported runway surface data (or display automated reported runway surface data) that has been rendered from various graphical user interface elements, tables, menus, buttons, and pictorial images, as described herein. Specifically, as described below, the display device 224 may render one or more of: a matrix button displays for runway surface condition codes (RwyCC) 261, for the SNOWTAM 262 for RwyCC RCAM 263, and for the runway surface conditions 281. In exemplary embodiments, the display device 224 is realized on one or more electronic display devices configured as a combination of an alphanumeric display, a vertical situation display (VSD) and a lateral navigation display (ND). During operation, the VSD continuously renders and updates a graphical representation of the aircraft 200 at its current location, additionally rendering the airspace, air traffic, navigational reference points, and a vertical flight plan associated with a flight plan of the aircraft 200. During operation, the ND continuously renders and updates a top-down graphical representation of the aircraft 200 at its current location (also referred to herein as a pictorial representation) and a route associated with a lateral flight plan of the aircraft 200; additionally, the ND may continuously overlay the graphical representation with one or more information layers of the terrain, meteorological conditions, airspace, air traffic, and navigational reference points. When the aircraft 200 is in the air, the displayed route may be part of a landing procedure, and when the aircraft 200 is on the ground, the displayed route may be a taxi route and include surface conditions on the displayed route. Each of the VSD and ND is responsive to display commands from the control module 204 and/or display system 212. As mentioned above, in some embodiments, the display system 212 may be an integral part of the EFB 290.

Renderings on the display system 212 may be processed by a graphics system, components of which may be integrated into the display system 212 and/or be integrated within the control module 204. Display methods include various types of computer-generated symbols, text, and graphics information representing, for example, flight path, airspeed, altitude, runway surface information of conditions of surface obstacles, terrain, and required navigation performance (RNP) data in an integrated, multi-color or monochrome form. Display methods also include various formatting techniques for visually distinguishing objects and routes from among other similar objects and routes. The control module 204 is said to display various images and selectable options described herein. In practice, this may mean that the control module 204 generates display commands, and, responsive to receiving the display commands from the control module 204, the display system 212 displays, render, or otherwise visually conveys on the display device 224, the graphical images associated with the operation of the aircraft 200, and specifically, the tabular and pictorial images as described herein.

The user input device 210 and the control module 204 are cooperatively configured to allow a user (e.g., a pilot, co-pilot, or crew member) to interact with graphic user interfaces displayed on display devices in the display system 212 (i.e. inputs of selection of RwyCC, RCAM, SNOWTAM etc.) and/or other elements of the system 202, as described in greater in the below. Depending on the embodiment, the user input device 210 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 210 is configured as a touchpad or touchscreen, it may be integrated with the display system 212. As used herein, the user input device 210 may be used to inform a pilot to select a runway condition displayed and accept of change a calculated distance of the runway at a landing.

In various embodiments, any combination of the FMS 208, user input device 210, and transceiver 206, may be coupled to the display system 212 such that the display system 212 may additionally generate or render, on a display device, real-time information associated with respective aircraft 200 components, required runway distance calculations, runway surface conditions, runway airspeed, landing distances, weighting of the aircraft, and braking systems. Coupled in this manner, the FMS 208 and transceiver 206 are configured to support navigation, flight planning, and other aircraft control functions (including reporting data of runway surface conditions) in a conventional manner, as well as to provide real-time data and/or information regarding the operational status of the aircraft 200 to the control module 204. Additionally, in some embodiments, the user input device 210, FMS 208, and display system 212 are configured as a control display unit (CDU) for displaying, among other things, runway surface data.

External sources 250 (i.e. servers of the airports, cloud servers etc.) communicate with the aircraft 200, generally by way of transceiver 206. External sources 250 include: weather data sources 252, such as a source for meteorological terminal aviation weather reports (METARS), automatic terminal information service (ATIS), datalink ATIS (D-ATIS), automatic surface observing system (ASOS); traffic data system(s) 254; air traffic control (ATC) 256; runway surface condition data sources (i.e. wet/dry/contaminated runway distance data tables) 258, and a variety of other radio inputs. The weather data is understood to be weather data at or relevant to, the runways and runway surface conditions under analysis. The traffic data system(s) 220 include numerous systems for providing real-time neighbors/relevant traffic data and information such as runway conditions and runway surface conditions. For example, traffic data sources 254 may include any combination of traffic collision avoidance system (TCAS), automatic dependent surveillance-broadcast (ADS-B), traffic information system (TIS), crowd-sourced traffic data and/or another suitable avionics system. Flight traffic information that is received from the traffic data system may include, for each neighbor aircraft of a plurality of neighbor aircraft, one or more of a respective (i) instantaneous position and location, vertical speed, and ground speed, (ii) instantaneous altitude, (iii) instantaneous heading of the aircraft, and (iv) aircraft identification.

The transceiver 206 is configured to support instantaneous (i.e., real-time or current) communications between the aircraft 200 and the one or more external data source(s) 250. As a functional block, the transceiver 206 represents one or more transmitters, receivers, and the supporting communications hardware and software required for the system 202 to communicate with the various external data source(s) 250 as described herein (and for automated or semi-automated functionalities to receive reported runway surface data). In an example, the transceiver 206 supports bidirectional pilot-to-ATC (air traffic control) communications via a data link. In addition to supporting the data link system, the transceiver 206 is configured to include or support an automatic dependent surveillance-broadcast system (ADS-B), a communication management function (CMF) uplink, a terminal wireless local area network (LAN) unit (TWLU), or any other suitable radio communication system that supports communications between the aircraft 200 and the various external source(s) 250. In this regard, the transceiver 206 may allow the aircraft 200 to receive information that would otherwise be unavailable to the pilot and/or co-pilot using only the onboard systems including historical data related to runway surface conditions, data tables related to distances for various runway surface conditions etc.

In various embodiments, the control module 204 is additionally operationally coupled to one or more databases 214. The databases 214 may include an airport features database, having therein maps and geometries, as well as airport status data for the runways and/or taxi paths at the airport; the airport status data indicating operational status, the dry/wet/contaminated distance tables, historic runway surface data, RwyCC, SNOWTAM, RwyCC RCAM codes, baseline runway distance calculations, braking application information, and directional information for the runways and taxi paths (or portions thereof). The airport status data also includes hot-spot information, which means known high-congestion areas and details related thereto. Additionally, the databases 214 may include a terrain database, having therein topographical information for the airport and surrounding environment.

The control module 204 and the display system 212 are cooperatively configured to cause the display device 224 to render information about a current runway in use, runway surface conditions, and, responsive to a runway change, render tabular and pictorial images, as described in more detail below. A technical effect that can be provided by the control module 204 is the presentation of relevant information about the host aircraft, the original runway distance calculations, and the new corrected required runway distance calculations (ex. with runway surface conditions) displayed in an intuitive and quickly comprehensible side by side format. This may decrease cognitive load and increase the speed of decision making in this crucial scenario.

As mentioned, the control module 204 performs the functions of the system 202. As used herein, the term "module" refers to any means for facilitating communications and/or interaction between the elements of the system 202 and performing additional processes, tasks and/or functions to support the operation of the system 202, as described herein. In various embodiments, the control module 204 may be any hardware, software, firmware, electronic control component, processing logic, and/or processor device, individually or in any combination. Depending on the embodiment, the control module 204 may be implemented or realized with a general purpose processor (shared, dedicated, or group) controller, microprocessor, or microcontroller, and memory that executes one or more software or firmware programs; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Further in FIG. 2, in an exemplary embodiment of the control module 204, there is included a processor 240 and a memory 242. The processor 240 may include any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 242 may include RAM memory, ROM memory, flash memory, registers, a hard disk, or another suitable non-transitory short or long-term storage media capable of storing computer-executable programming instructions or other data for execution. The memory 242 may be located on and/or co-located on the same computer chip as the processor 240. Generally, the memory 242 maintains data bits and may be utilized by the processor 240 as storage and/or a scratch pad during operation. Specifically, the memory 242 stores instructions and applications 249. Information in the memory 242 may be organized and/or imported from an external source 250 during an initialization step of a process; it may also be programmed or selected via a user input device 210. During operation, the processor 240 loads and executes one or more programs, algorithms, and rules embodied as instructions and applications 249 contained within the memory 242 and, as such, controls the general operation of the control module 204 as well as the system 202.

The novel program 267 includes rules and instructions which, when executed, cause the control module 204 to perform the functions, techniques, and processing tasks associated with the operation of the system 202 (i.e. logic rules for creating the mapping solutions). Novel program 267 and associated stored variables 234 may be stored in a functional form on computer readable media, as depicted, in memory 242. While the depicted exemplary embodiment is described in the context of a fully functioning computer system 202, those skilled in the art will recognize that the mechanisms of the present disclosure are capable of being distributed as a program product 243, with one or more types of non-transitory computer-readable signal bearing media used to store the program and the instructions thereof and carry out the distribution thereof, such as a non-transitory computer readable medium bearing the program 267 and containing computer instructions stored therein for causing a computer processor (such as the processor 240) to perform and execute the program 267. Such a program product 243 may take a variety of forms, and the present disclosure applies equally regardless of the type of computer-readable signal bearing media used to carry out the distribution. Examples of signal bearing media include recordable media such as floppy disks, hard drives, memory cards, and optical disks, and transmission media such as digital and analog communication links. It will be appreciated that cloud-based storage and/or other techniques may also be utilized in certain embodiments.

In executing the process described herein, the processor 240 specifically loads the instructions embodied in the program 267, thereby being programmed with program 267. During execution of program 267, the processor 240 and the memory 242 form a novel runway surface condition processing engine that performs the processing activities of the system 202.

In various embodiments, the processor/memory unit of the control module 204 may be communicatively coupled (via a bus 245) to an input/output (I/O) interface 244, and a database 246. The bus 245 serves to transmit programs, data, status and other information or signals between the various components of the control module 204. The bus 245 can be any suitable physical or logical means of connecting computer systems and components. This includes, but is not limited to, direct hard-wired connections, fiber optics, infrared and wireless bus technologies.

The I/O interface 244 enables intra control module 204 communication, as well as communications between the control module 204 and other systems 202 components, and between the control module 204 and the external data sources via the transceiver 206. The I/O interface 244 may include one or more network interfaces and can be implemented using any suitable method and apparatus. In various embodiments, the I/O interface 244 is configured to support communication from an external system driver and/or another computer system. Also, in various embodiments, the I/O interface 244 may support communication with technicians, and/or one or more storage interfaces for direct connection to storage apparatuses, such as the database 246. In one embodiment, the I/O interface 244 is integrated with the transceiver 206 and obtains data from the external data source(s) directly.

The database 246 may include an aircraft-specific parameters database (including aircraft-specific parameters for aircraft 200 (i.e. aircrafts weights etc.), as well as for a variety of other aircraft) and parameters and instructions for processing user inputs and rendering images on the display device 224, as described herein. In some embodiments, database 246 is part of the memory 242. In various embodiments, the database 246 and the database 214 are integrated, either within the control module 204 or external to it. Accordingly, in some embodiments, the airport features and terrain features are pre-loaded and internal to the control module 204. Another form of storage media that may be included in, and utilized by, the control module 204 is an optional hard disk 248.

In various exemplary embodiments, the images displayed on the display device 224 are based on current host aircraft status data for the aircraft 200 and can be dynamically updated based on continuously obtaining the current aircraft status data. The external data may be received from runway surface data sources 258, weather data sources 252 and traffic data sources 254; accordingly, the graphic user interfaces on display device 224 may also be incorporated with simulated and pictorial display features that are continuously updated to reflect weather conditions, current runway surface conditions, and neighbor traffic/relevant traffic within the bounds of a pictorial representation.

In an exemplary embodiment, a technical advantage that may be provided by the control module 204 is an intuitive visual presentation of factors for a pilot to consider in the course of evaluating a runway change, and a runway surface condition change. The presentation is described as intuitive because it clearly shows events and factors at their respective locations of relevance and provides side by side comparisons of the original runway and the new runway. The pictorial representation (not shown) can depict a Landing or Departure operation. The pictorial representation can show, for example, a three-dimensional view of a portion of the airport, the runway surface condition, the runway etc. that incorporates environmental status such as terrain and traffic, weather status, runway surface conditions, airport hotspot data, and aircraft 200 performance data.

FIG. 3 is an exemplary operational assessment matrix (RCAM) table 300 issued by the FAA that describes the reporting data that is used to assess the runway surface condition and the braking action reported by the pilot related to the reporting data received for the runway surface condition system in accordance with an embodiment. The table 300 is read from left to right, where the airport operator will attempt to match a runway condition to a runway surface condition code and to a pilot reported braking to provide information via voice communications to the pilot. Hence, the airport operator will assess the runway surface condition 310 and report the runway surface condition in accordance with the assessment criteria. For the runway surface condition and contaminant depth (Non-RwyCC): the airport operators will evaluate the runway condition 310 and report the runway surface condition such as dry, wet, snow etc. . . . along with the contaminant depth 315 in cases of contaminated runways via ATIS broadcast or NOTAM.

In the RwyCC and the use of the Runway Condition Assessment Matrix (RCAM) where the RCAM replaces subjective judgments of runway surface conditions with objective assessments tied directly to contaminant type and depth categories. The airport operator assesses the runway condition and report through the utilization of the Runway Condition Assessment Matrix (RCAM) codes (RwyCC) 320. The ATC provides Runway Contaminant Codes (RwyCC) ranging from 1 to 6 (i.e. column of 320), which correspond to conditions (as an example) of a runway divided into thirds. In various embodiments, the divided runway may be displayed in simulated pictorial displays as described in FIG. 2.

For example, if the Air Traffic Control (ATC) provides the pilot with runway contaminant codes (RCCs) of 1/2/4. This indicates the first third of the runway is covered in ice, while the second third of the runway is covered in water or slush with a depth greater than 3 mm, and the last part (i.e. last third) of the runway is covered in cold compact snow. The pilot would choose the most conservative, i.e. the lowest (in this case, 1), of the three RCCs and use it to compute the required runway distance.

The runway surface condition 310 descriptions are categorized based on temperature, type, and depth of contaminant. In total, there are 7 Runway Condition Codes (RwyCC) 320 for the runway surface conditions in the range of 0 to 6, with 6 being better than good and 0 being the worst condition resulting "Nil" braking action. The RwyCC 320 will be ascertained by the airport operator and used by pilots to help determine braking action performance. The RwyCC are only reported when greater than 25% of the runway is contaminated. When less than 25% is contaminated, only the type of contamination for each third of the runway is reported. The NOTAM systems assign the RwyCC for each third of the runway based on the contaminant information the airport operator enters into the NOTAM system.

The RCAM table 300 includes contaminant type and depth categories which have been determined by airplane manufacturer to cause specific changes in the airplane braking performance. The runway surface condition 310 description of the RCAM provides contaminants that are directly correlated to airplane takeoff and landing performance. The description sections, ranging in terms of slipperiness, are categorized based on type and depth of contaminant and sometimes temperature. The contaminant description is applied to each runway third.

This runway surface condition code 320 corresponds to a reportable 'shorthand' of the runway surface condition 310 descriptions. Additionally, the contaminants in this area have very specific characteristics effect, depending on the depth, and some depending on temperature. For example, description 317 describes "⅛ inch depth or less". So, contaminants in this area that are in the ⅛ inch or less depth category, for example, dry snow and wet snow, have a different effect then when at a greater depth resulting in different calculated required runway distances.

The SNOWTAM (Non-RwyCC) is a special series NOTAM notifying the presence, or removal, of hazardous conditions due to snow, ice, slush or standing water associated with snow, slush and ice on the movement area, by means of a specific format.

In the SNOWTAM the pilot reports the braking action, for example, as: "Braking action MEDIUM reported". The estimated braking action 340 can be expressed in SNOWTAM as follows: good, good to medium, medium, medium to poor, poor, and nil.

The pilot reports the condition to ATC and the ATC uses the data to evaluate the runway surface condition. The runway distance processor module (121 of FIG. 1) accepts each different way of runway surface condition reporting such as RwyCC (RCAM) and Non-RwyCC (i.e. runway surface condition and contaminant depth, and SNOWTAM) as shown in table 300 and computes the required runway distance.

Figure 4:
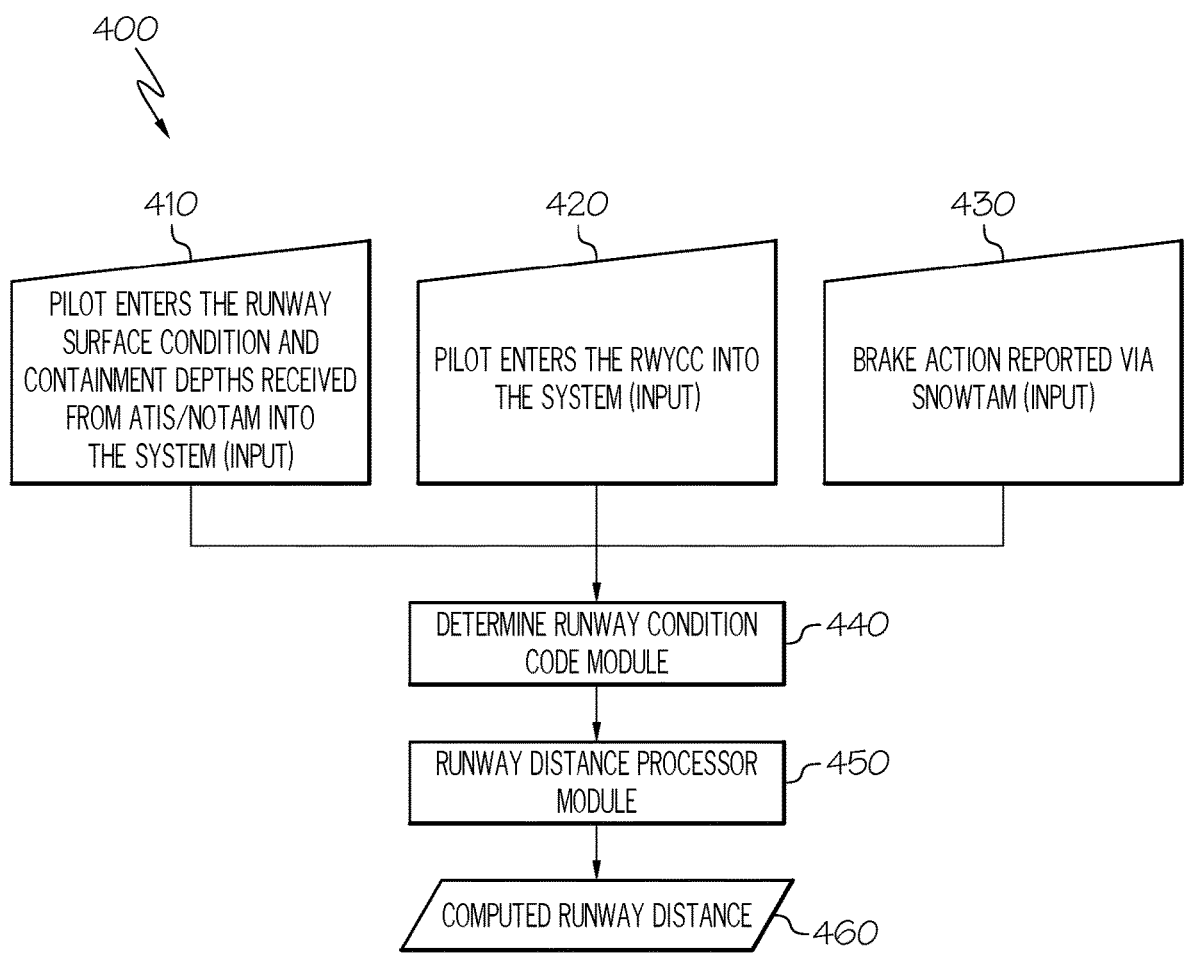
FIG. 4 illustrates a flow diagram of an entry process for the runway surface condition for the runway surface condition system in accordance with an embodiment.

FIG. 4 illustrates a flow diagram of an entry process for the runway surface condition system in accordance with an embodiment. In FIG. 4, the entry process 400 enables the airport operator to report the runway surface condition and the pilot to enter the reported surface condition data into the system. While the implementation is described with a manual entry process (i.e. for convenient applicability for legacy aircraft systems), it is contemplated the reported data from the airport operator can be implemented in an internet of things (IoT) architecture where machine to machine requests can be automatically sent and processed between the aircraft to the airport servers for retrieval of the runway surface condition data (i.e an automated process without a manual entry step) by onboard processing modules of the aircraft. For example, the aircraft avionics systems can send requests directly to the airport server (or other ground servers) and request the surface condition data for processing with an onboard runway distance calculating module. In FIG. 4 at step 410, the pilot can enter the runway surface condition and contaminant depths received from ATIS/NOTAM by various input means (210 of FIG. 2) on the aircraft. At step 420, the pilot enters the RwyCC into avionics systems of the aircraft. At step 430, the brake action application is determined based on a brake action configuration reported via inputs of data from the SNOWTAM. At step 440, the inputted data for the runway surface condition is re-configured for use in the runway distance application by a pre-set set of codes indicative of the current runway surface condition. The selected codes are sent to the determination runway condition code module. At step 450, the code data describing the runway surface condition is received by the runway distance processor module for re-calculating taking into account the runway surface condition by the runway surface code data. At step 460, the computer may calculate the required runway distance based on in part the runway surface code by using algorithmic solutions that weight the runway surface code when calculating the required runway distance.

Figure 5:
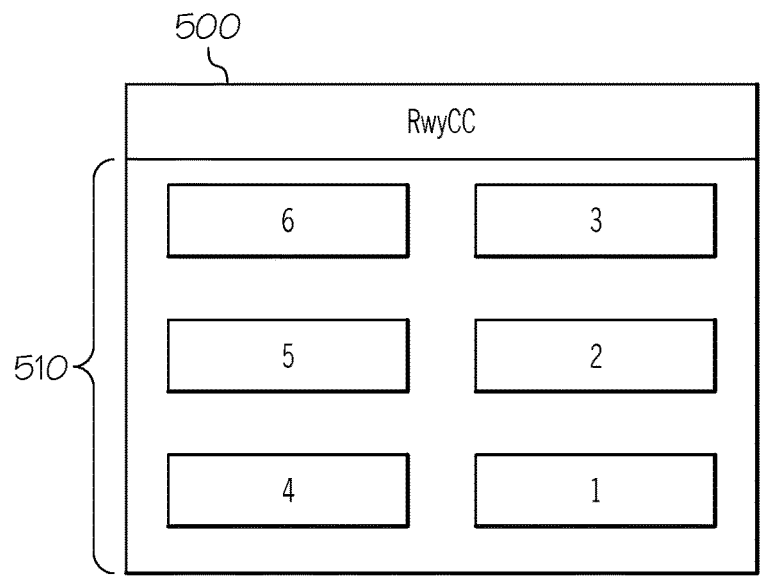
FIG. 5 illustrates a diagram of a runway surface condition (RwyCC) entry configuration for entering the RwyCC code describing the runway surface condition of the runway surface condition system in accordance with an embodiment.

FIG. 5 illustrates a diagram of a runway surface condition (RwyCC) entry configuration for entering the RwyCC code describing the runway surface condition of the runway surface condition system in accordance with an embodiment. As illustrated in FIG. 5, the RwyCC graphic user interface 500 includes touch selections configured for manually selecting an RCAM code corresponding to selector buttons 510 with icons in a range from 1 to 6 and for inputting a touch selection to the runway surface condition system for processing and determining the required runway distance. In the particular configuration in the graphic user interface, 500 of the set of inputs 1 to 6 (of 320 of FIG. 3) are displayed as selector buttons 510 for each RCAM code. When the RCAM code is received from Airport operator, the pilot simply receives the RCAM code via another avionics system and inputs by making a touch selection of one of the set of buttons 510 that are displayed in the graphic user interface 500 (i.e. the pilot enters the RwyCC by entering an RCAM code ranging from 1 to 6).

Figure 6:
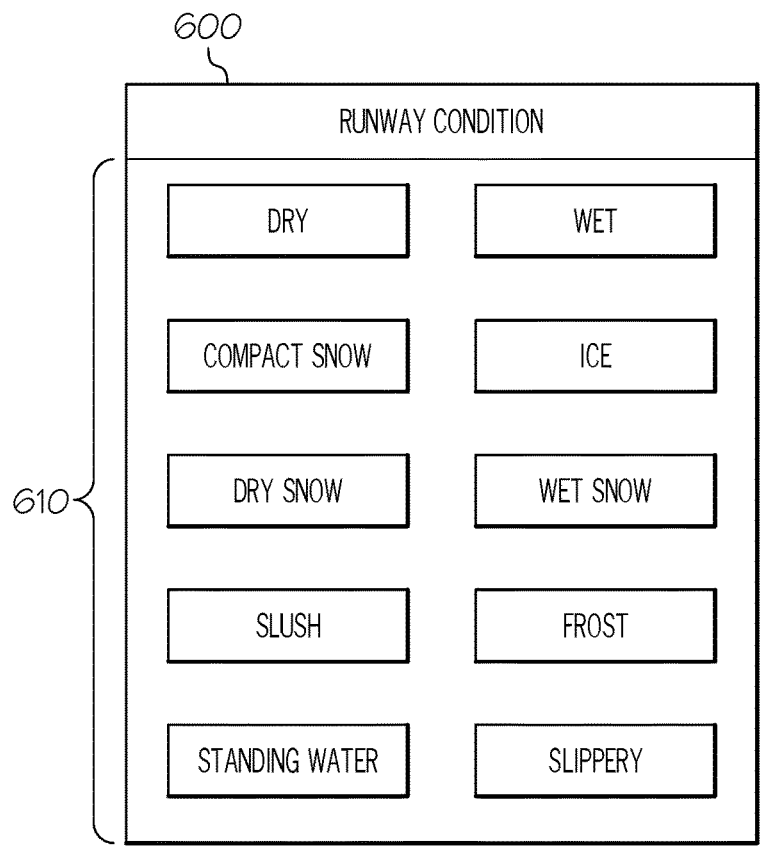
FIG. 6 illustrates a diagram of a runway surface condition and contaminant depth (Non-RwyCC) entry display configuration for entering the reported runway surface condition of the runway surface condition system in accordance with an embodiment.

In FIG. 6, illustrates a diagram of a runway surface condition and contaminant depth (Non-RwyCC) entry display configuration for entering the reported runway surface condition of the runway surface condition system in accordance with an embodiment. When the runway surface condition and contaminant depth is received from an airport operator (i.e. ATC or other ground personnel), then the runway surface condition system will enable the user to select via a graphic user interface 600 displayed of runway conditions (310 of FIG. 3), the appropriate runway condition entered. In other words, the runway surface condition system will display a page including a graphic user interface 600 that allows for touch selections of buttons 610 corresponding to each runway surface condition. In this case, the set of buttons 610 are labeled (or may be configured with icons) of dry, compact snow, slush, standing water, wet, ice, wet snow, frost and slippery labels for selection by the pilot. The pilot upon learning of the runway surface condition will select the labeled button that corresponds to the reported runway surface condition and accepts the contaminant depth entry when the runway surface condition is contaminated. The pilot will be able to select the appropriate Runway surface condition and contaminant depth the graphic user interface 600 displayed in the page on a cockpit screen or a mobile device.

Figure 7:
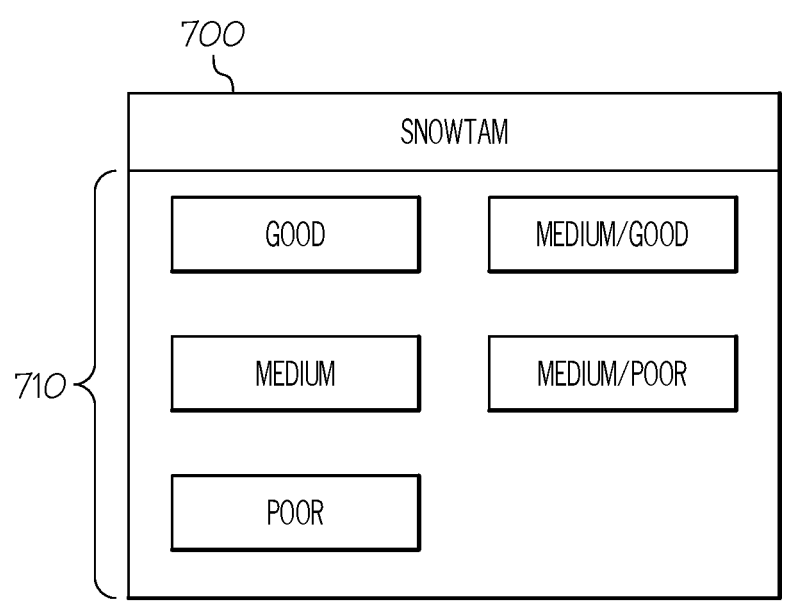
FIG. 7 illustrates a diagram of a SNOWTAM entry display configuration for entering the reported SNOWTAM of the runway surface condition system in accordance with an embodiment.

FIG. 7 illustrates a diagram of a SNOWTAM entry display configuration for entering the reported SNOWTAM of the runway surface condition system in accordance with an embodiment. In FIG. 7, when the SNOWTAM (i.e. Non-RwyCC) is received from Airport operator, then the runway surface condition system will allow the pilot to select the reported SNOWTAM braking action (340 of FIG. 3). The pilot will be able to select the appropriate SNOWTAM braking action via a graphic user interface 700 display of runway condition braking actions. In other words, the runway surface condition system will display a page including a graphic user interface 700 that allows for touch selections of buttons 710 corresponding to each reported SNOWTAM braking action. In this case, the set of buttons 710 are labeled (or may be configured with icons) of: good, medium, medium/good, medium, medium/poor and poor for selection by the pilot. The pilot upon learning of the SNOWTAM will select the labeled button that corresponds to the reported SNOWTAM braking action.

In various exemplary embodiments, the runway condition code module will map the runway condition code to the reported runway surface condition or RwyCC or SNOWTAM and the mapped runway condition code is used to compute the required runway distance. The runway surface condition module will process the input from the pilot using a set of rules. The logic for an exemplary set of inputs for mapping inputs, runway surface conditions to RCAM codes (i.e. the mapping logic) is as follows:

In a first exemplary case, the internal mapped runway condition code=1 if the (i.e. the pilot entry) RwyCC is 1, or the pilot entry of the braking action is poor and the pilot entry of the runway surface condition is ice.

In a second exemplary case, the internal mapped runway condition code=2 if the if the (i.e. the pilot entry) RwyCC is 2, or the pilot entry of the braking action is medium to poor, or the runway surface condition is STDG WTR (i.e. standing water) and runway contaminant depth is >0.125 inches, or the pilot entry of the runway surface condition is slush and Runway contaminant depth is >0.125 inches.

In a third exemplary case, the internal mapped runway condition code=3 if the RwyCC is 3, or the pilot of the braking action is medium, or the runway surface condition is CMPCT SNOW (i.e. compact Snow) and OAT (operating air temperature) is >−15 Deg. C, of the pilot entry of the runway surface condition, is DRY SNOW and the runway contaminant depth is >0.125 inches, or the pilot entry of the runway surface condition is WET SNOW and the runway contaminant depth is >0.125 inches, or the runway surface condition is SLIPPERY.

In a fourth exemplary case, the runway condition code=4, if the RwyCC is 4, or the pilot entry of the braking action is GOOD TO MEDIUM, or the pilot entry of the runway surface condition is CMPCT SNOW (Compact snow) and the OAT is <−15 deg C.

In a fifth exemplary case, the runway condition code=5, if the RwyCC is 5, or the pilot entry of the braking action is GOOD, or the pilot entry of the runway surface condition is WET.

In a sixth exemplary case, the runway condition code=6, if the RwyCC is 6, or the pilot entry of the braking action N/A, or the pilot entry of the runway surface condition is DRY.

Figure 8:
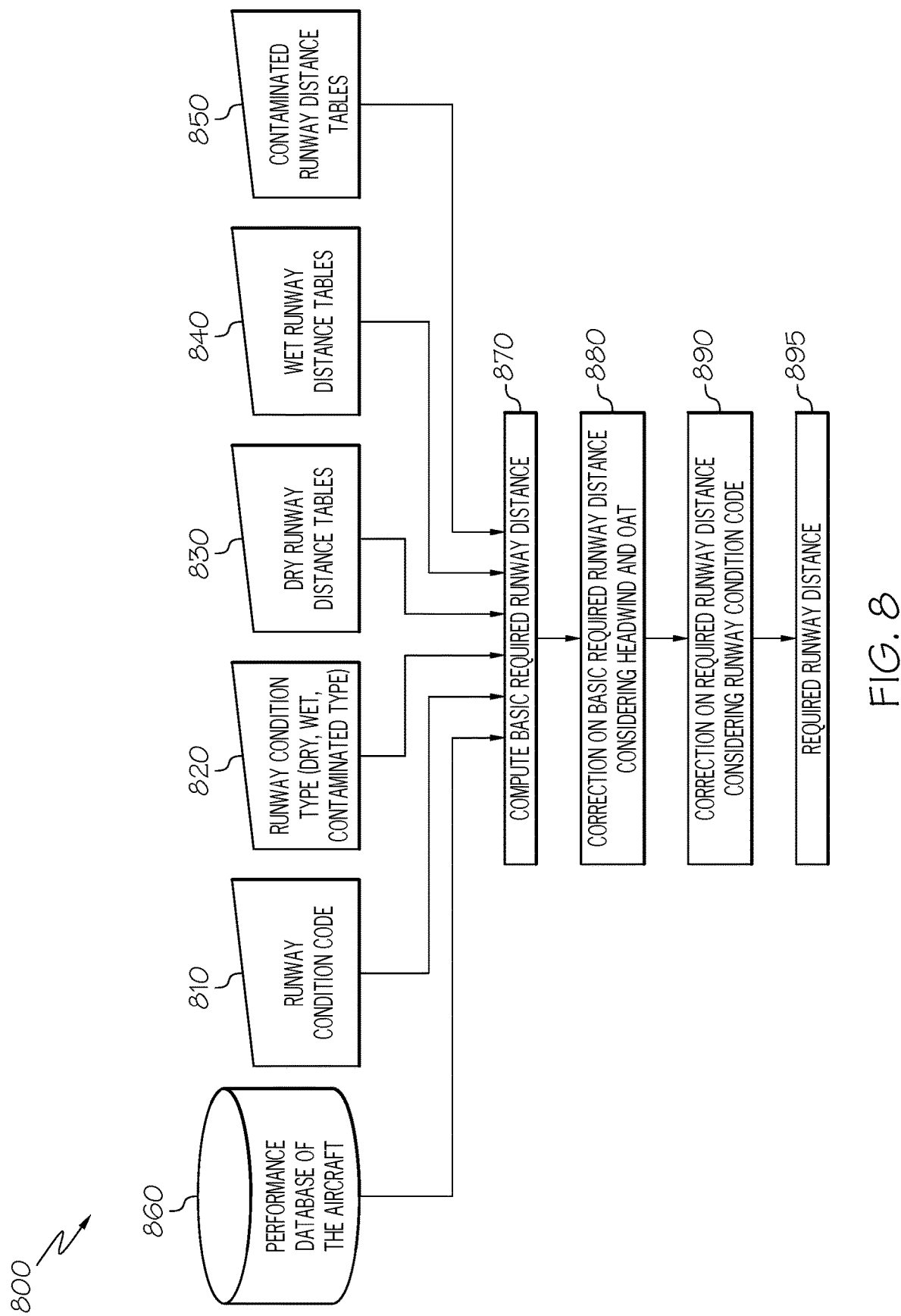
FIG. 8 is a flowchart of the runway distance processor module processing of the inputs for the runway surface condition system in accordance with an embodiment.

FIG. 8 is a flowchart of the runway distance processor module processing of the inputs for the runway surface condition system in accordance with an embodiment. In the flowchart 800, the runway distance processor module receives one or more of a plurality of inputs to compute the basic required distance at step 870. The plurality of inputs include: the runway condition code 810, the runway condition type (i.e. dry, wet, contaminated type) 820, the dry runway distance tables 830, the wet runway distance tables 840, the contaminated runway distance tables 850, and the performance data of the aircraft from a performance database of the aircraft 860. With runway condition code data, the runway condition type data, the wet, dry and contaminated distance tables, and the performance data, using various algorithmic solutions, the basic required runway distance can be calculated locally using processor of avionics systems of the aircraft (i.e. FMS etc.) and a baseline runway distance is calculated at step 870. Next, the correction factor is applied to the baseline distance calculations at step 880 to take into account environmental factors such as headwind and OAT. At step 890, the runway condition code is taken into account and another correction is made to the required runway distance calculations. Once both corrections are made of the headwind and OAT and the runway condition code mapped or reported, then the required runway distance at step 895 is produced.

In various exemplary embodiments, the runway distance processor module uses the following parameters and data to compute runway distance required: runway condition codes (as determined by the runway condition code module), the outside air temperature (OAT) values as input in the exemplary cases from RwyCC ways of reporting surface condition, the performance database parameters of the aircraft, the dry runway distance table data, the wet runway distance table data, the contaminated runway distance table data, and the runway surface condition surface condition type.

In various exemplary embodiments, the runway surface condition types include dry, wet or contaminated runway surface condition types that are used to identify the appropriate performance tables (i.e. wet, dry, and contaminated tables) that are used for the computing the required runway distance.

In various exemplary embodiments, the runway condition code is considered as a correction factor to enable a selection by the runway surface condition system of the appropriate performance table when the reported surface condition is contaminated.

In various exemplary embodiments, when the RwyCC is deemed a 2 or 3, then the equivalent water/contaminant depth is considered as a constant high value depth equivalent to the friction of 25 Mu where the constant value can be adjusted by updates from of constant value data from a database or the constant value can be implemented in the distance calculation solutions as configurable item to provide more accurate distance calculations.

In various exemplary embodiments, for better required runway distance computations, the depth values are used as correction factors to the calculated required runway distances where higher values of the depth are applied with lesser values for the friction values which in turn can yield a lesser calculated stopping distance.

Figure 9:
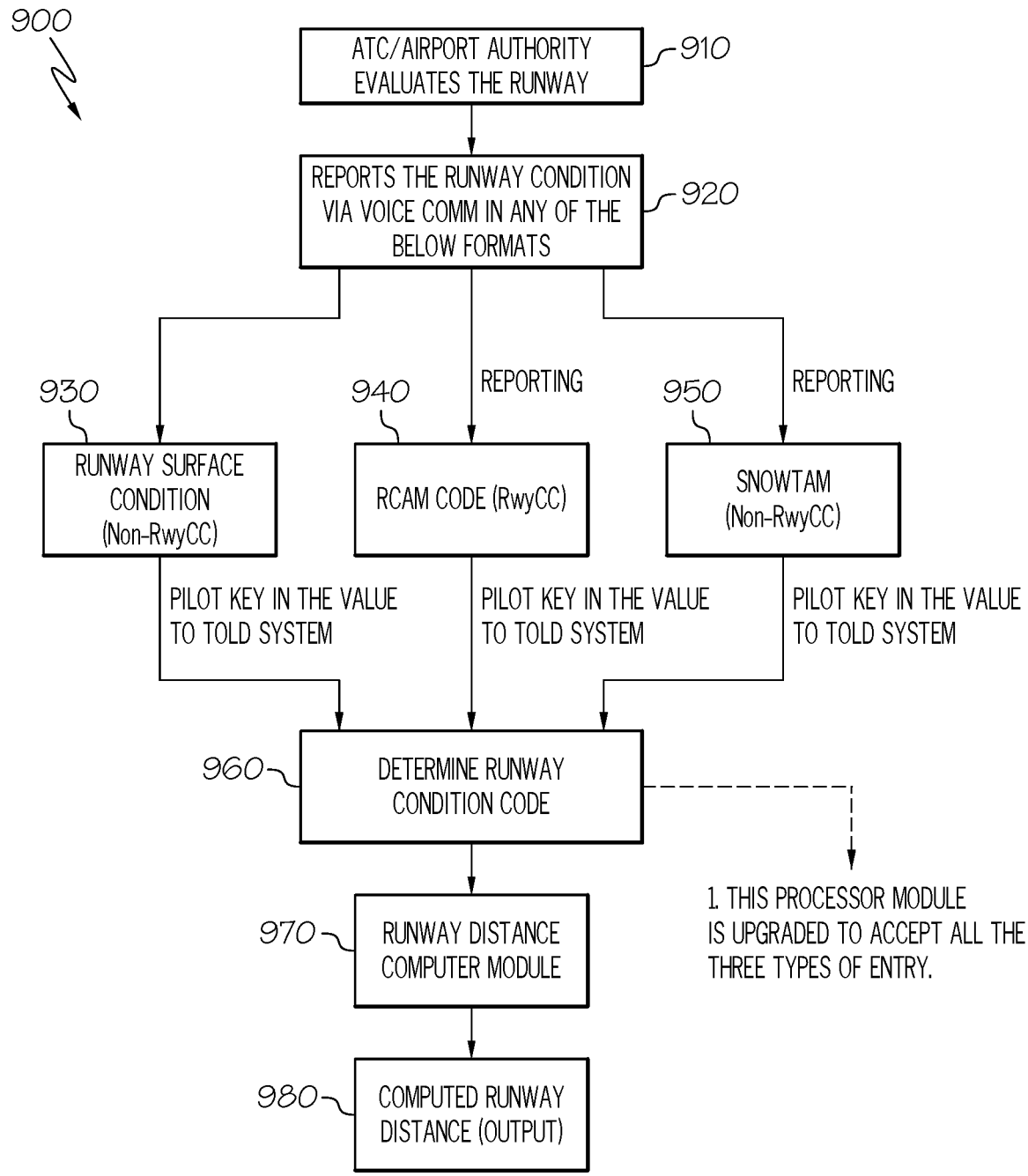
FIG. 9 is a block diagram of RCAM code entry into a takeoff and landing data (TOLD) system with the ground surface condition system in accordance with an embodiment.

FIG. 9 is a block diagram of RCAM code entry into a takeoff and landing data (TOLD) system with the ground surface condition system in accordance with an embodiment. In FIG. 9, the TOLD system 900 includes at block 910, an evaluation by the ATC and/or airport authorities the runway and the runway surface condition. At block 920, the ATC, airport authorities and/or other ground personnel/controllers report the runway condition via voice communications in a selected format to the aircraft. In exemplary embodiments, the reporting of the runway surface condition can be transmitted in more than one format.

In addition, in various alternative exemplary embodiments, the TOLD system can be extended to automatically receive and accept the reported runway surface condition. That is while it is described that the airport authority or ATC reports the runway surface condition via voice communications, using datalinks (or other data modes) that are available, the runway surface condition data can be sent and decoded by the TOLD system for automatic insertion into the TOLD system. The reporting data of the runway surface condition are sent at block 930 in a runway surface condition (i.e. Non-RwyCC format), at block 940 in an RCAM mode (i.e. RwyCC format), and at block 950 in a SNOWTAM (i.e. Non-RwyCC format) where the pilot entry can be manually performed by keying in the value of one of the formats to the runway surface condition system via a particular graphical user interface associated with each format type. At block 960, the runway surface condition processor determines the runway condition code. With respect to implementation in legacy aviation runway surface condition systems, the runway surface condition processor is an upgrade that accepts the three types of entry. At block 970, the runway distance processor (i.e. computer module) receives the runway surface condition code and the pilot entries as to the runway surface condition. At block 980, the runway surface condition processor using algorithmic solutions, in a two-step manner taking into account corrections based on the runway surface condition code and corrections from the runway surface condition entered by the pilot, calculates an initial baseline runway distance that is further corrected based on the runway surface condition code and the runway surface condition entered by the pilot. In addition, the landing or takeoff weight of the aircraft is factored into the required runway distance calculations.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic is shown depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, include one or more physical or logical modules of computer instructions that may, for instance, be organized as an object, procedure, or function. Nevertheless, the executables of an identified module need not be physically located together but may include disparate instructions stored in different locations that, when joined logically together, include the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method for assessing runway conditions to compute, by a processor disposed in an avionic system of an aircraft, a required runway distance of the aircraft while facilitating a landing or takeoff of the aircraft at an airport wherein a runway is subject to different runway surface conditions, the method comprising:

processing, by the processor, at least a first, second, and third types of runway surface information of a plurality of types of runway surface information transmitted by air traffic control (ATC) wherein a broadcast of data transmissions of the ATC comprises: a first type of reported runway surface condition information, a second type of a set of Runway Condition Assessment Matrix (RCAM) codes, and a third type of a set of runway surface condition codes comprising: Snow Warning To Airmen (SNOWTAM) codes;

selecting, at least one of the first, second, or third types of runway surface information to input to the processor, to enable the processor to estimate at least a braking distance and a braking action of the aircraft;

receiving, by input, one of at least the first, second, or third types of runway surface information by the processor;

mapping, by the processor, a runway surface condition reported or entered of the first, second, or third types of runway surface information, to a particular runway condition code to compute the required runway distance; and further mapping, by the processor, the runway surface condition related to the first, second, and third types of runway surface information to the set of RCAM codes based on one or more of a plurality of actions on the part of a pilot governed by a set of logical rules applied to the actions comprising: a pilot entry of a selection of an RCAM code, the pilot entry of a selection of the braking action, and the pilot entry of the selection of the runway surface condition wherein the pilot entry is performed using a graphic user interface coupled to the processor for sending each selection to the processor to calculate the required runway distance for the plurality of types of runway surface information, and to enable the pilot to switch between each of the plurality of types of runway surface information by providing a set of calculated runway distances for pilot use in control of one or more operational actions of the aircraft in at least the landing or takeoff of the aircraft.

2. The method of claim 1, further comprising:

entering the input by either manual operations of the pilot using the graphic user interface coupled to the processor in response to runway surface information communicated by voice transmissions to the pilot, or by input from automated responses from a ground server to data requests from the processor when landing or takeoff wherein the ground server is electronically connected to the processor.

3. The method of claim 2, the mapping further comprising:

processing by the processor, the input and the entry from the pilot using a set of rules mapping inputs, and entries of runway surface conditions to RCAM codes comprising:

an internally mapped runway condition code (RCC)=1 if the input of a runway surface condition code (RwyCC) =1, or the pilot entry of the braking action is poor and the pilot entry of the runway surface condition is ice;

the internally mapped RCC=2 if the RwyCC=2, or the pilot entry of the braking action is medium to poor, or the runway surface condition is standing water and a runway contaminant depth is >0.125 inches or the pilot entry of the runway surface condition is slush and the runway contaminant depth is >0.125 inches;

the internally mapped RCC=3 if the RwyCC=3, or the pilot entry of the braking action is medium, or the runway surface condition is compact snow and an operating air temperature (OAT) is >−15 degrees Celsius, or the pilot entry of the runway surface condition is dry snow and the runway contaminant depth is >0.125 inches, or the pilot entry of the runway surface condition is wet snow and the runway contaminant depth is >0.125 inches, or the runway surface condition is slippery;

the internally mapped RCC=4, if the RwyCC=4, or the pilot entry of the braking action is good to medium, or the pilot entry of the runway surface condition is compact snow and the OAT is <−15 degrees Celsius;

the internally mapped RCC=5, if the RwyCC=5, or the pilot entry of the braking action is good, or the pilot entry of the runway surface condition is wet; and the internally mapped RCC=6, if the RwyCC=6, or the pilot entry of the braking action is not applicable, or the pilot entry of the runway surface condition is dry.

4. The method of claim 3, further comprising:

calculating the required runway distance by the processor for the landing or takeoff based on additional runway surface information retrieved from the ground server comprising: wet, dry, and contaminated runway distance data from tables stored by the ground server for correcting a required runway distance calculation.

5. The method of claim 4, further comprising:

correcting, by the processor, the calculated required runway distance based on current environmental conditions at a time of the landing or takeoff comprising: a headwind and an outside air temperature.

6. The method of claim 4, wherein the RCAM codes range in value from 1 to 6 corresponding to each runway surface condition comprising a set of environmental conditions of ice, snow, slush, water, wetness, and dry runway surfaces.

7. The method of claim 2, further comprising:

calculating the required runway distance by the processor for the landing or takeoff based in part on the first, second, or third types of runway surface information received by the input.

8. The method of claim 7, further comprising:

calculating the required runway distance by the processor for the landing or takeoff using aircraft performance data from a performance database of the aircraft comprising: a calculated landing or takeoff weight of the aircraft.

9. An apparatus for detecting performance of a current landing or takeoff of an aircraft by predicting landing or takeoff distance of the aircraft prior to the landing or takeoff for a current flight, the apparatus comprising:

at least one processor programmed to receive at least a first, second, and third types of runway surface information transmitted by air traffic control (ATC) which comprises: a first type of reported runway surface condition information, a second type of a set of Runway Condition Assessment Matrix (RCAM) codes, and a third type of a set of runway surface codes which comprise: Snow Warning To Airmen (SNOWTAM) codes;

one or more inputs sent to the at least one processor of a selection of at least one of the first, second, or third types of runway surface information for processing to estimate at least a braking distance or a braking action of the aircraft; and a matrix of mapped runway surface codes generated by the at least one processor by mapping using a set of rules for applying each runway surface condition derived from the first, second or third types of runway surface information to a runway condition code to compute a required runway distance;

wherein the at least one processor is programmed to map a runway surface condition to the first, second, and third types of runway surface information to generate the matrix by the set of rules to identify at least one of the set of RCAM codes from on one or more of a plurality of actions on the part of a pilot governed by the set of rules comprising: a pilot entry of selection of an RCAM code, the pilot entry of selection of the braking action, and the pilot entry of selection of the runway surface condition wherein the pilot entry is performed using a graphic user interface coupled to the at least one processor to send the inputted selection to the at least one processor to calculate the required runway distance for the plurality of types of runway surface information, and to enable the pilot to switch between each of the plurality of types of runway surface information by providing a set of calculated runway distances for pilot use in control of one or more operational actions of the aircraft in at least the landing or takeoff for the current flight.

10. The apparatus of claim 9, further comprising:

the one or more inputs entered by either a manual operation of the pilot via the graphic user interface coupled to the at least one processor in response to runway surface information communicated by voice transmissions to the pilot, or entered by automated responses from a ground server in response to a data request from the at least one processor at landing or takeoff wherein the ground server is electronically connected to the at least one processor.

11. The apparatus of claim 10, further comprising:

a model generated, by the at least one processor, based on a baseline model of the aircraft to calculate the required runway distance for the landing or takeoff taking into account the first, second, or third types of runway surface information.

12. The apparatus of claim 11, further comprising:

the at least one processor correcting the model for the required runway distance calculations for the landing or takeoff based on runway surface information retrieved from the ground server from wet, dry, and contaminated runway distance tables stored in a database of historic wet, dry, and contaminated runway distance calculations.

13. The apparatus of claim 12, further comprising:

the at least one processor correcting the model for a required runway distance calculation for the landing or takeoff based on runway surface information retrieved from a performance database of aircraft performance data at least comprising: a landing or takeoff weight of the aircraft.

14. The apparatus of claim 13, further comprising:

the at least one processor correcting the model for the required runway distance calculation for the landing or takeoff based on environmental conditions at least comprising: a runway headwind and an outside air temperature.

15. A non-transitory, computer-readable medium containing instructions thereon, which, when executed by a processor, perform a method comprising:

implementing, by the processor, a model to determine a required runway distance by processing at least one of a first, second, and third types of runway surface information of a plurality of types of runway surface information transmitted by air traffic control (ATC) comprising: a first type of reported runway surface condition information, a second type of a set of Runway Condition Assessment Matrix (RCAM) codes, and a third type of a set of runway condition surface codes comprising: Snow Warning To Airmen (SNOWTAM) codes;

selecting at least one of the first, second, or third types of runway surface information to input to the processor and to estimate at least a braking action of the aircraft;

receiving by input one of at least the first, second, or third types of runway surface information by the processor;

mapping, by the processor, a runway surface condition reported or entered of the first, second, or third types of runway surface information to a runway condition code to compute the required runway distance; and further mapping by the processor the runway surface condition to the first, second, and third types of runway surface information to generate the matrix by a set of rules to identify at least one of the set of RCAM codes from on one or more of a plurality of actions on the part of a pilot governed by the set of rules comprising: a pilot entry of selection of an RCAM code, the pilot entry of selection of the braking action, and the pilot entry of selection of the runway surface condition wherein the pilot entry is performed using a graphic user interface coupled to the processor to send the inputted selection to the processor to calculate the required runway distance for the plurality of types of runway surface information, and to enable the pilot to switch between each of the plurality of types of runway surface information by providing a set of calculated runway distances for pilot use in control of one or more operational actions of the aircraft.

16. The method of claim 15, further comprising:

entering the input by either manual operations of the pilot using the graphic user interface coupled to the processor in response to runway surface information communicated by voice transmissions to the pilot, or by input from automated responses from ground servers in response to a data request wherein the ground servers are electronically coupled to the processor.

17. The method of claim 16, further comprising:

calculating the required runway distance by the processor for a landing and a takeoff based on the first, second or third types of runway surface information received by the input.

18. The method of claim 17, further comprising:

calculating the required runway distance by the processor for landing and takeoff using runway surface information retrieved from the ground servers comprising: wet, dry, and contaminated runway distance data for correcting the required runway distance calculation.

* * * * *